(12) United States Patent
Horiuchi et al.

(10) Patent No.: US 9,740,954 B2
(45) Date of Patent: Aug. 22, 2017

(54) CHARACTER STRING RECOGNITION DEVICE AND CHARACTER STRING RECOGNITION METHOD

(71) Applicant: Sharp Kabushiki Kaisha, Osaka-shi, Osaka (JP)

(72) Inventors: Kenichi Horiuchi, Osaka (JP); Hirokazu Ishikawa, Osaka (JP); Tatsuo Kishimoto, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/038,746

(22) PCT Filed: Sep. 22, 2014

(86) PCT No.: PCT/JP2014/075069
§ 371 (c)(1),
(2) Date: May 24, 2016

(87) PCT Pub. No.: WO2015/079790
PCT Pub. Date: Jun. 4, 2015

(65) Prior Publication Data
US 2017/0004373 A1   Jan. 5, 2017

(30) Foreign Application Priority Data

Nov. 28, 2013  (JP) ................................. 2013-246527

(51) Int. Cl.
*G06K 9/34* (2006.01)
*G06K 9/32* (2006.01)
*G06T 7/11* (2017.01)

(52) U.S. Cl.
CPC ............ *G06K 9/344* (2013.01); *G06K 9/325* (2013.01); *G06T 7/11* (2017.01); *G06K 2209/01* (2013.01);

(Continued)

(58) Field of Classification Search
CPC ................ A61N 5/1037; A61N 5/1049; A61N 2005/1061
See application file for complete search history.

(56) References Cited

U.S. PATENT DOCUMENTS

2011/0280541 A1* 11/2011 Lee .......................... G06T 7/238
386/226
2012/0250943 A1   10/2012 Aomi
2014/0362240 A1* 12/2014 Klivington ......... H04N 5/23267
348/208.1

FOREIGN PATENT DOCUMENTS

JP        2011-134144 A    7/2011

* cited by examiner

*Primary Examiner* — Edward Park
(74) *Attorney, Agent, or Firm* — Keating & Bennett, LLP

(57) ABSTRACT

The present disclosure prevents erroneous recognition of a character string that is not actually contained in a video. In the present disclosure, a rectangular region extraction section (12) extracts a rectangular region string from an image contained in a video created by an image capture section (10), the rectangular region being a unit region for recognition of a character string. A recognition determination section (14) determines the rectangular region to be "true" in a case where conditions (a) and (b) are met or determines the rectangular region to be "false" in a case where at least one of the conditions (a) and (b) is not met, the condition (a) being such that the rectangular region does not overlap, by a certain percentage or more, another rectangular region contained in another image in the video, the another image being an immediately previous target of translation processing, the another rectangular region containing an actually recognized character string, the condition (b) being such that the rectangular region overlaps only either a first end region or a second end region, the first end region having a predetermined width and being located in a first end of the image, the second end region having a predetermined width (Continued)

and being located in a second end of the image which second end is opposite the first end. A character string recognition section (18) performs a character string recognition for the rectangular region in a case where the rectangular region is determined to be "false" and skips the character string recognition for the rectangular region in a case where the rectangular region is determined to be "true."

4 Claims, 5 Drawing Sheets

(52) U.S. Cl.
CPC .............. *G06T 2207/10016* (2013.01); *G06T 2207/30176* (2013.01)

CHARACTER STRING RECOGNITION DEVICE AND CHARACTER STRING RECOGNITION METHOD

TECHNICAL FIELD

The present invention relates to (i) a character string recognition device for recognizing a character string contained in an image of a video and (ii) a character string recognition method for recognizing a character string contained in an image of a video.

BACKGROUND ART

In known techniques, optical character recognition (OCR) is performed for a character string contained in a recorded video, and a translation of the recognized character string) is then displayed in real time via superimposition on the recorded video. For example, Patent Literature 1 discloses an information display device in which a character string contained in, for example, a document or signboard is photographed by a camera and is then converted either into (i) a translation of the character string, through use of a dictionary, or (ii) other related information. The translation or the related information is then displayed via replacement of or superimposition on the original character string.

CITATION LIST

Patent Literature

[Patent Literature 1]
Japanese Patent Application Publication, Tokukai, No. 2011-134144 (Publication date: Jul. 7, 2011)

SUMMARY OF INVENTION

Technical Problem

Disadvantageously, though, the art disclosed in Patent Literature 1 can erroneously recognize a character string that is not actually in the recorded video. Such an erroneous recognition is particularly likely to occur when the information display device experiences shake during operation, due to hand-induced shake or some other factor. If an erroneous recognition occurs, then a translation of a character string that is incomprehensible is displayed, via superimposition on the video. This results in user dissatisfaction.

The present invention has been made in view of the above problem. An object of the present invention lies in providing a character string recognition device and a character string recognition method, both of which make it possible to prevent erroneous recognition of a character string that is not actually contained in a video, and, as a result, make it possible to prevent displaying, via superimposition on the video, a translation of a character string that is incomprehensible.

Solution to Problem

In order to solve the above problem, a character string recognition device in accordance with one aspect of the present invention includes: an image capture section for capturing an image of a subject to create a video of the subject; an extraction section for extracting, from any image contained in the video, a rectangular region being a unit region for recognition of a character string; a determination section for determining the rectangular region to be "true" in a case where conditions (a) and (b) are met or determining the rectangular region to be "false" in a case where at least one of the conditions (a) and (b) is not met, the condition (a) being such that the rectangular region does not overlap, by a certain percentage or more, another rectangular region contained in another image in the video, the another image being an immediately previous target of translation processing, the another rectangular region containing an actually recognized character string, the condition (b) being such that the rectangular region overlaps only either a first end region or a second end region, the first end region having a predetermined width and being located in a first end of the image, the second end region having a predetermined width and being located in a second end of the image which second end is opposite the first end; and a recognition section for performing a character string recognition for the rectangular region in a case where the rectangular region is determined to be "false" by the determination section, the recognition section skipping the character string recognition for the rectangular region in a case where the rectangular region is determined to be "true" by the determination section.

Furthermore, in order to solve the above problem, a character string recognition method in accordance with another aspect of the present invention includes the steps of: capturing an image of a subject to create a video of the subject; extracting, from any image contained in the video, a rectangular region being a unit region for recognition of a character string; determining the rectangular region to be "true" in a case where conditions (a) and (b) are met or determining the rectangular region to be "false" in a case where at least one of the conditions (a) and (b) is not met, the condition (a) being such that the rectangular region does not overlap, by a certain percentage or more, another rectangular region contained in another image in the video, the another image being an immediately previous target of translation processing, the another rectangular region containing an actually recognized character string, the condition (b) being such that the rectangular region overlaps only either a first end region or a second end region, the first end region having a predetermined width and being located in a first end of the image, the second end region having a predetermined width and being located in a second end of the image which second end is opposite the first end; and performing a character string recognition for the rectangular region in a case where the rectangular region is determined to be "false" in the step of determining, the performing of the character string recognition being skipped in a case where the rectangular region is determined to be "true" in the step of determining.

Furthermore, in order to solve the above problem, a character string recognition device in accordance with another aspect of the present invention includes: an image capture section for capturing an image of a subject to create a video of the subject; an extraction section for extracting, from any image contained in the video, a rectangular region being a unit region for recognition of a character string; a determination section for determining the rectangular region to be "true" in a case where conditions (a) and (b) are met or determining the rectangular region to be "false" in a case where at least one of the conditions (a) and (b) are not met, the condition (a) being such that the rectangular region has a width that is equal to or less than a predetermined fraction of a width of the image, the condition (b) being such that the rectangular region has a height equal to or greater than a product of multiplying the width of the rectangular region by a predetermined factor; and a recognition section for performing a character string recognition for the rectangular region in a case where the rectangular region is determined to be "false" by the determination section, the recognition section skipping the character string recognition for the rectangular region in a case where the rectangular region is determined to be "true" by the determination section.

Additional objects, features, and strengths of the present invention will be made clear by the description below. Furthermore, the advantages of the present invention will be evident from the following explanation with reference to the drawings.

Advantageous Effects of Invention

An aspect of the present invention makes it possible to prevent erroneous recognition of a character string that is not actually contained in a video, and, as a result, makes it possible to prevent displaying, via superimposition on the video, a translation of a character string that is incomprehensible.

DESCRIPTION OF EMBODIMENTS

Embodiment 1

A first embodiment in accordance with the present invention is discussed below with reference to FIGS. 1 through 8.

(Configuration of Terminal Device 1)

Figure 1:
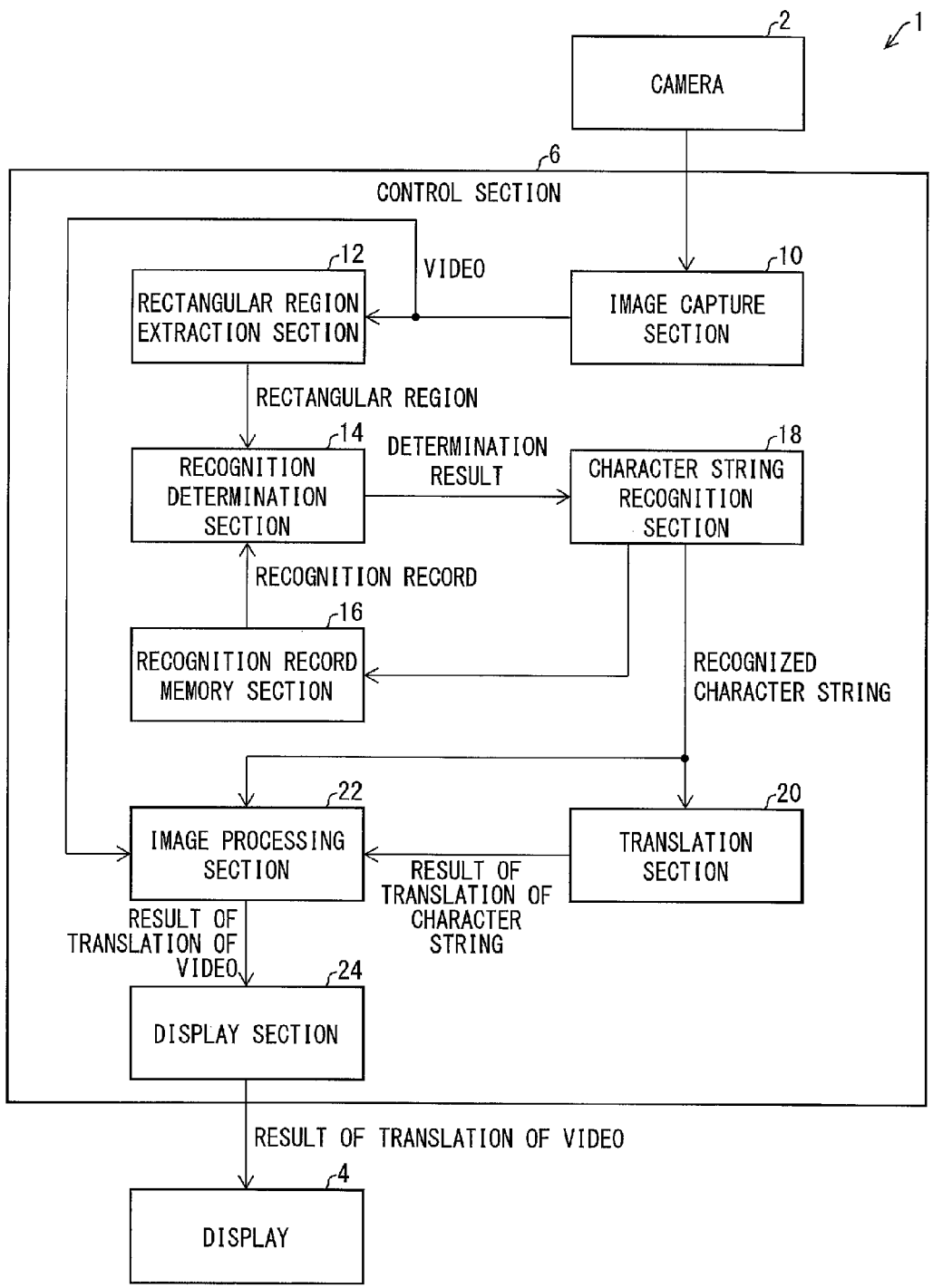
FIG. 1 is a block diagram illustrating a configuration of a main part of a terminal device in accordance with Embodiment 1 of the present invention

First, a configuration of a main part of a terminal device 1 (character string recognition device) in accordance with Embodiment 1 is described with reference to FIG. 1. FIG. 1 is a block diagram illustrating a configuration of a main part of the terminal device 1 in accordance with Embodiment 1 of the present invention. As shown in FIG. 1, the terminal device 1 includes a camera 2, a display 4, and a control section 6. The control section 6 controls, in an integrated manner, the operation of every member within the terminal device 1, including the camera 2 and the display 4. The control section 6 includes an image capture section 10 (image capture section), a rectangular region extraction section 12 (extraction section), a recognition determination section 14 (determination section), a character string recognition section 18 (recognition section), a translation section 20 (translation section), an image processing section 22, and a display section 24 (display section).

The terminal device 1 of Embodiment 1 is a so-called mobile terminal device for which hand-held operation by a user is possible. Non-limiting examples of the terminal device 1 include a smartphone and a tablet device.

(Details of Processing)

Processing in the terminal device 1 in accordance with Embodiment 1 is discussed in detail below with reference to FIGS. 2 through 8.

Firstly, the image capture section 10 of the terminal device 1 controls the camera 2 to capture an image of an image subject (subject). Based on the image thus captured, a video of the image subject is created. The image capture section 10 outputs the video thus created to the rectangular region extraction section 12 and the display section 24.

Figure 2:
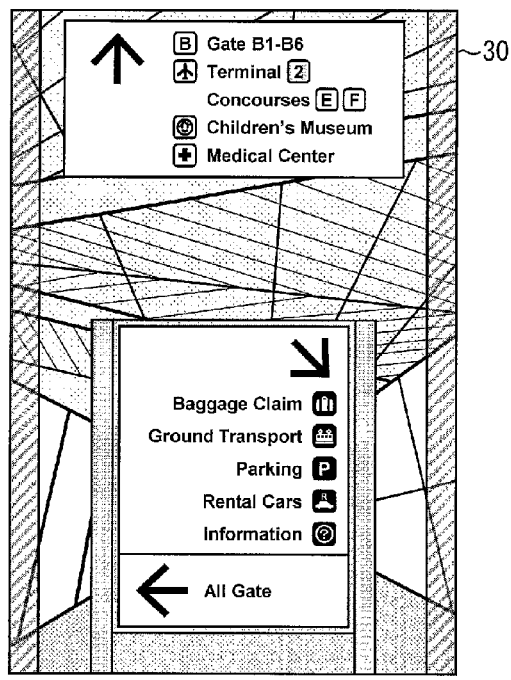
FIG. 2 is a view illustrating an image contained in a video in accordance with Embodiment 1 of the present invention.

The rectangular region extraction section 12, upon receipt of the video, extracts a rectangular region from any image (generally, an image that is the current frame) contained in the video, the rectangular region being a unit region for recognition of a character string. FIG. 2 is a view illustrating an image 30 contained in the video recorded by the terminal device 1 in Embodiment 1. In Embodiment 1, the image 30 shown in FIG. 2 is a target of rectangular region extraction.

Figure 3:
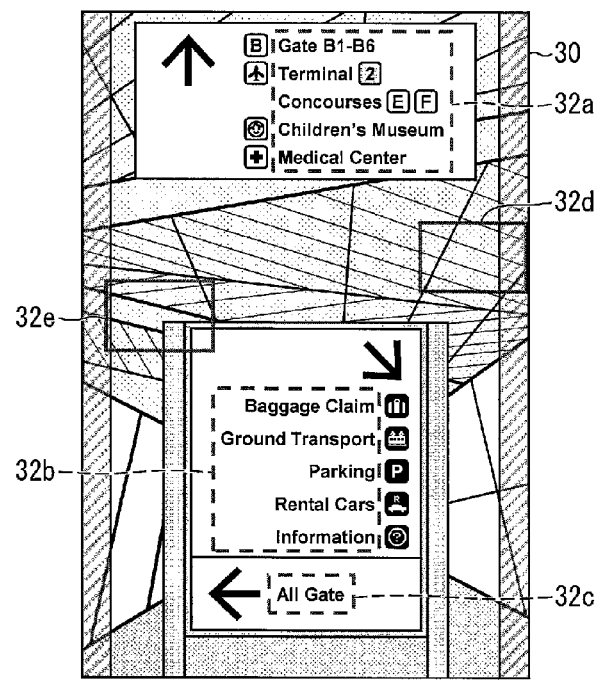
FIG. 3 is a view illustrating five rectangular regions that have been extracted from an image in accordance with Embodiment 1 of the present invention.

The rectangular region extraction section 12 extracts at least one rectangular region from the image 30 in accordance with a predetermined algorithm. In Embodiment 1, the rectangular region extraction section 12 extracts five rectangular regions 32a through 32e, as shown in FIG. 3. FIG. 3 is a view illustrating five rectangular regions 32a through 32e that have been extracted from the image 30 in accordance with Embodiment 1. After having extracted the rectangular regions 32a through 32e, the rectangular region extraction section 12 outputs them to the recognition determination section 14.

The recognition determination section 14 determines, upon receipt of each rectangular region, whether the rectangular region is to be a target of character string recognition. The following is a description of a recognition determination process.

Figure 4:
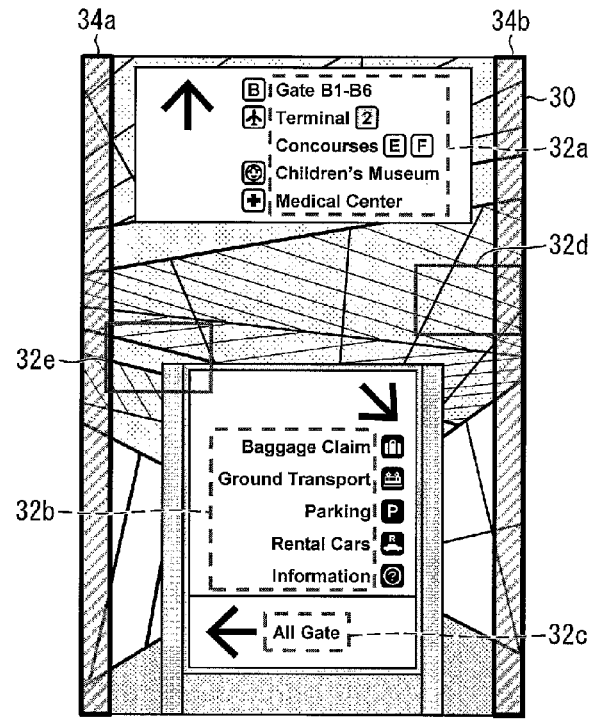
FIG. 4 is a view illustrating a left end region and a right end region, both of which have been predefined in an image in accordance with Embodiment 1 of the present invention.

FIG. 4 is a view illustrating a left end region 34a and a right end region 34b, both of which have been predefined in the image 30. As shown in FIG. 4, the left end region 34a and the right end region 34b have been predefined in the image 30. The left end region 34a is in a left end (first end) of the image 30, while the right end region 34b is in a right end (first end) of the image 30. The left end region 34a and the right end region 34b have respective predetermined widths being equivalent to each other. In Embodiment 1, the predetermined widths are each 10 pixels, but the present invention is not limited to this. Furthermore, the predetermined widths do not necessarily have to be equivalent to each other.

The recognition determination section 14 first determines whether or not a rectangular region overlaps the left end region 34a or the right end region 34b. As shown in FIG. 4, in Embodiment 1, the recognition determination section 14 determines that a rectangular region 32d overlaps the right end region 34b and that a rectangular region 32e overlaps the left end region 34a. As a result, the recognition determination section 14 deems these rectangular regions 32d and 32e to potentially be noise that should not actually be extracted from the image 30. In contrast, rectangular regions 32a through 32c overlap neither the left end region 34a nor the right end region 34b and are, therefore, not deemed to potentially be noise.

Figure 5:
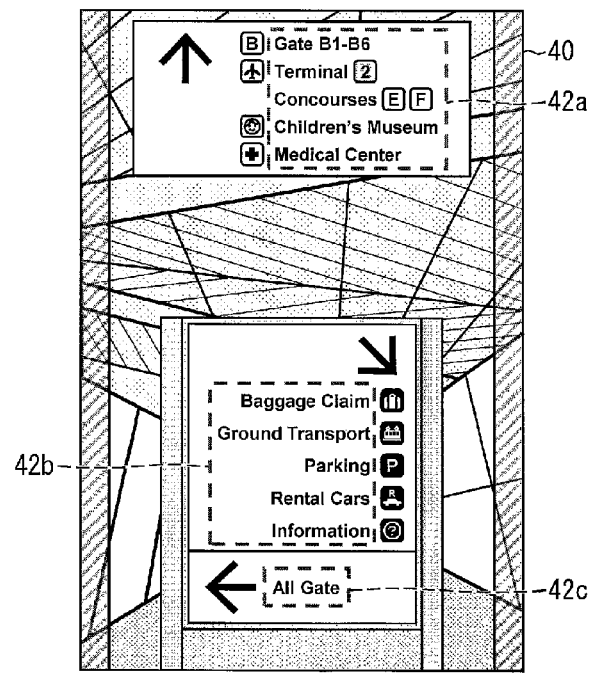
FIG. 5 is a view illustrating rectangular regions which (i) actually contain a recognized character string and (ii) are contained in an image which is an immediately previous target of translation in accordance with Embodiment 1 of the present invention.

The recognition determination section 14 next determines whether the rectangular region 32d and the rectangular region 32e are noise. This determination is carried out based on a recognition record of character strings in the video. The recognition record is stored in a recognition record memory section 16. In Embodiment 1, "recognition record" refers to information (e.g., coordinate information) that identifies at least one rectangular region (another rectangular region) which (i) is contained in an image 40 (another image) differing from the image 30, the image 40 being an immediately previous target of translation in the video and (ii) is a rectangular region containing an actually recognized character string. FIG. 5 is a view illustrating rectangular regions 40a through 40c, which (i) actually contain a recognized character string and (ii) are contained in the image 40, which is an immediately previous target of translation in Embodiment 1.

The image 40 is an image that temporally precedes the image 30 (i.e., the image 40 is a frame preceding the image 30). The image 40 is not limited to being an immediately previous frame. In a case where the immediately previous translation processing was carried out for an image that is two or more frames before the current image, that frame serves as the image 40.

The recognition determination section 14 determines, based on the recognition record, (i) whether the rectangular region 32d overlaps any of the rectangular regions 40a through 40c by a certain percentage or more and (ii) whether the rectangular region 32e overlaps any of the rectangular regions 40a through 40c by a certain percentage or more. In Embodiment 1, overlapping by "a certain percentage or more" refers to vertical overlap of 75% or more in the image 30 or lateral overlap of 75% or more in the image 30. Note, however, that the certain percentage is not limited to this figure.

As shown in FIG. 5, neither the rectangular region 32d nor the rectangular region 32e overlaps any of the rectangular regions 40a through 40c by a certain percentage or more. As a result, the recognition determination section still deems the rectangular region 32d and the rectangular region 32e to potentially be noise.

Figure 6:
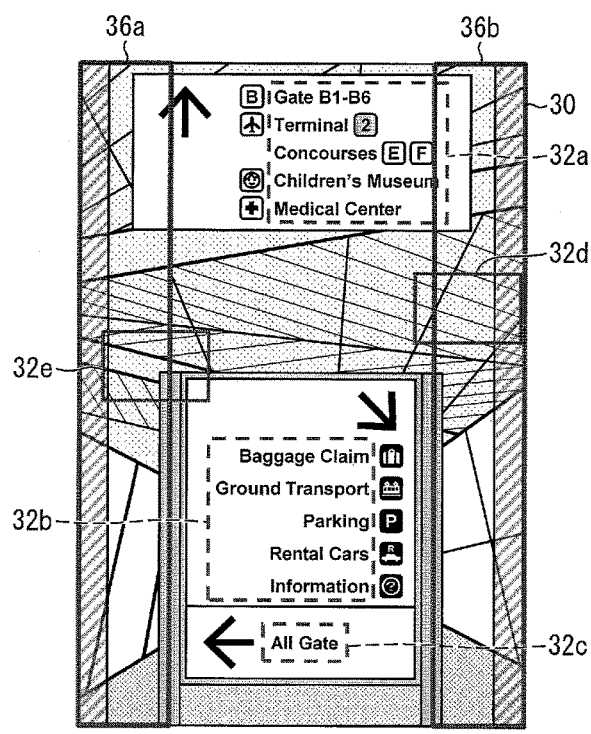
FIG. 6 is a view illustrating a left end region and a right end region, both of which have been predefined in an image in accordance with Embodiment 1 of the present invention.

The recognition determination section 14 lastly determines (i) whether the rectangular region 32d overlaps a right end region 36b predefined in the image 30 and (ii) whether the rectangular region 32e overlaps a left end region 36a predefined in the image 30. This process makes it possible to effectively determine whether to set an extracted rectangular region as a target of character string recognition. FIG. 6 is a view illustrating the left end region 36a and the right end region 36b, both of which have been predefined in the image 30. The left end region 36a and the right end region 36b each have a predetermined width. In Embodiment 1, the predetermined width is one-seventh of the width of the image 30, but the predetermined width not limited to this.

Since the rectangular region 32d overlaps the left end region 34a, the recognition determination section 14 determines whether the rectangular region 32d further overlaps the right end region 36b, which is located in a right end (second end) opposite the left end in which the left end region 34a is predefined. Furthermore, since the rectangular region 32e overlaps the right end region 34b, the recognition determination section 14 determines whether the rectangular region 32e further overlaps the left end region 36a, which is located in a left end (second end) opposite the right end in which the right end region 34b is predefined. For example, assume that the image 30 has a width of 720 pixels and includes an extracted rectangular region that is located between (i) a position five pixels away from the left end of the image 30 and (ii) a position 100 pixels away from the left end of the image 30. In such a case, the rectangular region does not overlap the right end region in the right end of the image 30, which right end region has a width of approximately 102 pixels. The recognition determination section 14 therefore determines that such a rectangular region is noise.

As shown in FIG. 6, the rectangular region 32a does not overlap the right end region 36b. That is, the rectangular region 32a overlaps only either (i) the left end region 34a, which is located in the left end of the image 30 in a horizontal direction of the image 30, or (ii) the right end region 36b, which is located in the right end of the image 30 in the horizontal direction of the image 30. As a result, the recognition determination section 14 determines the rectangular region 32a to be noise ("true"). Furthermore, as shown in FIG. 6, the rectangular region 32d does not overlap the left end region 36a. That is, the rectangular region 32d overlaps only either (i) the right end region 34b, which is located in the right end of the image 30 in the horizontal direction of the image 30, or (ii) the left end region 36a, which is located in the right end of the image 30 in the horizontal direction of the image 30. As a result, the recognition determination section 14 determines the rectangular region 32d to be noise ("true"). In contrast, the recognition determination section 14 determines all of the rectangular regions 32a through 32c not to be noise ("false").

Figure 7:
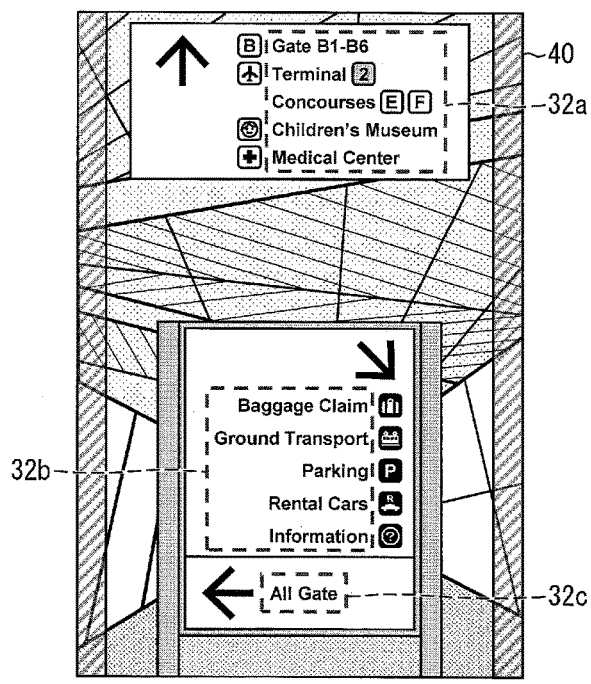
FIG. 7 is a view illustrating a rectangular region that has been confirmed as a target of character string recognition in an image in accordance with Embodiment 1 of the present invention.

The recognition determination section 14 outputs a determination result for each rectangular region to the character string recognition section 18. Furthermore, the recognition determination section 14 stores, in the recognition record memory section 16, information identifying the rectangular regions 32a through 32c, which have been determined to be targets of character string recognition rather than noise. This information is stored as the most recent recognition record. FIG. 7 is a view illustrating the rectangular regions 32a through 32c, which have been confirmed as targets of character string recognition in the image 30 in Embodiment 1. As shown in FIG. 7, out of the five rectangular regions 32a through 32e that have been extracted, only the rectangular regions 32a through 32c that actually contain an English character string are selected as targets of character string recognition. When the terminal device 1 carries out character string recognition and translation processing for an immediately subsequent image, the recognition determination section 14 obtains, from the recognition record memory section 16, information identifying the rectangular regions 32a through 32c. This information is obtained as a recognition record.

The character string recognition section 18 recognizes each character string from the rectangular regions 32a through 32c. This is done in accordance with the determination result inputted from the recognition determination section 14. The character string recognition section 18 outputs, to the translation section 20, each character string that has been recognized. The translation section 20 creates a translation of each character string that it receives. The translation section 20 then outputs the translation of each character string to the image processing section 22. The image processing section 22 creates a translation of the video by carrying out image processing in which the translation of the character string is superimposed on the image 30. The image processing section 22 outputs the translation thus created of the video to the display section 24. The display section 24 outputs the translation of the video to the display 4, so that the translation of the video is played (displayed) on the display 4. As a result, a user is able to view a video on which the translation of the character string is superimposed in real time.

Advantages of Embodiment 1

As described above, in the terminal device 1 according to Embodiment 1, character string recognition is skipped for the rectangular regions 32*d* and 32*e* in a case where it is determined that (i) each of the rectangular regions 32*d* and 32*e*, having been extracted, overlaps only either the left end region 34*a* in the image 30 or the right end region 34*b* in the image 30, and (ii) neither of the rectangular regions 32*d* and 32*e* overlaps, by a certain percentage or more, any of the rectangular regions 40*a* through 40*c*, the rectangular regions 40 through 40*c* being contained in the image 40 and actually having been targets of character string recognition, the image 40 being the immediately previous target of translation.

In a recorded video, a character string often appears in and near the middle of the image 30. Because of this fact, it is highly likely that the rectangular regions 32*d* and 32*e* do not contain a character string, the rectangular regions 32*d* and 32*e* each overlapping only either the left end region 34*a* in the image 30 or the right end region 34*b* in the image 30. Furthermore, if the terminal device 1 experiences shake during video recording, due to hand-induced shake or some other factor, the resultant video will be greatly distorted compared to what the user actually intended to obtain. As a result, an area differing from an area in which a character string actually exists is erroneously extracted as a rectangular region. It is highly likely that this sort of rectangular region as well does not contain a character string.

Therefore, according to Embodiment 1, the terminal device 1 makes it possible to prevent erroneous recognition of a character string that is not actually contained in a video. As a result, the terminal device 1 makes it possible to prevent displaying, via superimposition on the video, a translation of a character string that is incomprehensible. Furthermore, even in a case where the terminal device 1 experiences shake during video recording, due to hand-induced shake or some other factor, the terminal device 1 makes it possible to prevent displaying, via superimposition on the video, a translation of a character string that is incomprehensible.

Example: Video of a Restaurant Menu

Figure 8:
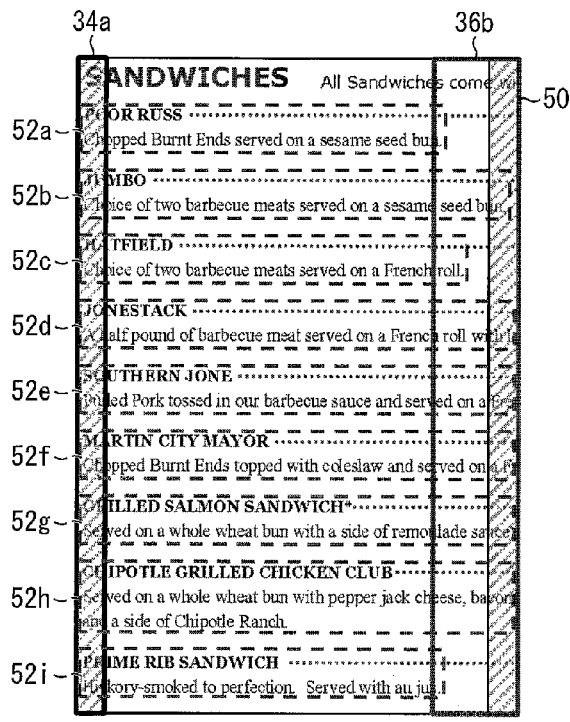
FIG. 8 is a view illustrating an image containing rectangular regions that are targets of character string recognition despite overlapping a left end region in accordance with Embodiment 1 of the present invention.

FIG. 8 is a view illustrating an image 50 in accordance with Embodiment 1. The image 50 contains rectangular regions 52*a* through 52*i*, which are targets of character string recognition despite overlapping a left end region 54. The image 50 is contained in a video created as a result of video recording of a restaurant menu.

In the example shown in FIG. 8, the rectangular region extraction section 12 extracts rectangular regions 52*a* through 52*i* from the image 50. Every one of these rectangular regions 52*a* through 52*i* overlaps the left end region 54, which is located in a left end of the image 50 and has a predetermined width. The rectangular regions 52*a* through 52*i* are therefore candidates for skipping of character string recognition. However, as shown in FIG. 8, every one of the rectangular regions 52*a* through 52*i* also overlaps a right end region 56, which is located in a right end of the image 50 and has a predetermined width. The recognition determination section 14 therefore determines that the rectangular regions 52*a* through 52*i* are not noise and thus should be targets of character string recognition. As a result, the character string recognition section 18 carries out recognition of character strings in the rectangular regions 52*a* through 52*i*.

Normally, it is highly likely that a character string is contained in a long rectangular region extending from the left end of an image to the right end of that image. The rectangular regions 52*a* through 52*i* extend from the left end to the right end in this manner. The terminal device 1 can therefore reliably set, as targets of character string recognition, the rectangular regions 52*a* through 52*i*, which are highly likely to contain a character string.

Embodiment 2

A second embodiment in accordance with the present invention is discussed below with reference to FIG. 9. Note that members of Embodiment 2 that are identical to members of Embodiment 1 are assigned equivalent symbols. Detailed explanations of such members will be omitted.

A terminal device 1 in accordance with Embodiment 2 is equivalent to the terminal device 1 of Embodiment 1 except that the recognition determination section 14 behaves in a different way. The recognition determination section 14 in accordance with Embodiment 1 uses a recognition record, but such a recognition record is not used in the terminal device 1 in accordance with Embodiment 2. Instead of using a recognition record, the terminal device 1 in accordance with Embodiment 2 determines whether each rectangular region extracted from the image 30 has an elongated shape. Character string recognition is (i) skipped for a rectangular region for which the result of this determination is "true" and (ii) carried out for a rectangular region for which the result of this determination is "false." With this configuration, the terminal device 1 makes it possible to prevent erroneous recognition of a horizontally written character string that is not actually contained in the video.

(Details of Processing)

Processing in the terminal device 1 in accordance with Embodiment 2 is discussed in detail below with reference to FIG. 9. FIG. 9 is a view illustrating the image 30, from which five rectangular regions have been extracted in Embodiment 2.

Figure 9:
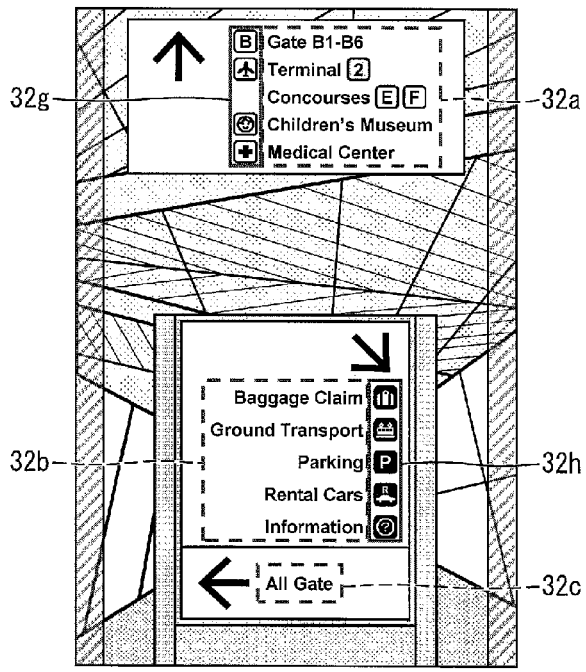
FIG. 9 is a view illustrating an image from which five rectangular regions in accordance with Embodiment 2 have been extracted.

As shown in FIG. 9, in Embodiment 2, the rectangular region extraction section 12 extracts five rectangular regions from the image 30. Rectangular regions 32*a*, 32*b*, and 32*c* are each a rectangular region that contains a character string in English and that has been extracted properly. Rectangular regions 32*g* and 32*h*, however, are rectangular regions that contain no character string but contain a plurality of pictograms in a vertical arrangement. Thus, the rectangular regions 32*g* and 32*h* are each a rectangular region that has been erroneously extracted and that should not be a target of character string recognition.

The recognition determination section 14 determines whether each rectangular region that has been extracted should be a target of character string recognition. The process of this determination is as follows. The recognition determinations section 14 firstly determines whether a rectangular region has a width equal to or less than a predetermined fraction of the width of the image 30. In Embodiment 2, the predetermined fraction is one tenth, but the present invention is not limited to this. Next, the recognition determination section 14 determines whether the rectangular region has a height equal to or greater than the product of multiplying the width of the rectangular region by a predetermined factor. In Embodiment 2, this predetermined factor is three, but the present invention is not limited to this.

In the example shown in FIG. 9, the character string recognition section 18 determines the rectangular regions 32g and 32h to be "true" (to be noise). In contrast, the rectangular regions 32a, 32b, and 32c are determined to be "false" (i.e., not noise). The character string recognition section 18 therefore skips character string recognition for the rectangular regions 32g and 32h but carries out character string recognition for the rectangular regions 32a, 32b, and 32c. As a result, the rectangular regions 32g and 32h, which contain pictograms but not a character string, are not set as targets of character string recognitions or of subsequent translation.

Advantages

In the terminal device 1 of Embodiment 2, in a case where the rectangular regions 32g and 32h, having been extracted, are determined to be vertically elongated, character string recognition is skipped for the rectangular regions 32g and 32h. Typically, in horizontally written languages such as English, it is highly likely that a rectangular region that is vertically elongated does not actually contain any character string and has been extracted in error. Therefore, the terminal device 1 in accordance with Embodiment 2 makes it possible to prevent erroneous recognition of a character string that is not actually contained in the video. As a result, when the terminal device 1 translates a character string contained in the video and then displays a translation of the character string via superimposition on the video, it becomes possible to prevent displaying, via superimposition on the video, a translation of a character string that is incomprehensible.

Embodiment 3

The control section 6 of the terminal device 1 can be realized by a logic circuit (hardware) provided in an integrated circuit (IC chip) or the like or can be alternatively realized by software as executed by a central processing unit (CPU).

In the latter case, the terminal device 1 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

Overview

In order to solve the abovementioned problem, in a first aspect of the present invention, a character string recognition device (terminal device 1) includes: an image capture section (image capture section 10) for capturing an image of a subject to create a video of the subject; an extraction section (rectangular region extraction section 12) for extracting, from any image contained in the video, a rectangular region being a unit region for recognition of a character string; a determination section (recognition determination section 14) for determining the rectangular region to be "true" in a case where conditions (a) and (b) are met or determining the rectangular region to be "false" in a case where at least one of the conditions (a) and (b) is not met, the condition (a) being such that the rectangular region does not overlap, by a certain percentage or more, another rectangular region contained in another image in the video, the another image being an immediately previous target of translation processing, the another rectangular region containing an actually recognized character string, the condition (b) being such that the rectangular region overlaps only either a first end region or a second end region, the first end region having a predetermined width and being located in a first end of the image, the second end region having a predetermined width and being located in a second end of the image which second end is opposite the first end; and a recognition section (character recognition section 18) for performing a character string recognition for the rectangular region in a case where the rectangular region is determined to be "false" by the determination section, the recognition section skipping the character string recognition for the rectangular region in a case where the rectangular region is determined to be "true" by the determination section.

With the above configuration, character string recognition is skipped for a rectangular region in a case where it has been determined that (i) the rectangular region, having been extracted, overlaps only one of two ends of an image and (ii) the rectangular region does not overlap, by a certain percentage or more, any rectangular region that has actually been a target of character string recognition and that is contained in an image that is an immediately previous target of translation.

In a recorded video, a character string often appears in and near the middle of the image. Because of this fact, it is highly likely that a character string is not contained in a rectangular region overlapping only either the left end of the image or the right end of the image. Furthermore, if the character string recognition device experiences shake during video recording, due to hand-induced shake or some other factor, the resultant video will be greatly distorted compared to the what the user actually intended to obtain. As a result, an area differing from an area in which a character string actually exists is erroneously extracted as a rectangular region. It is highly likely that this sort of rectangular region as well does not contain a character string.

Therefore, with the above configuration, it is possible to prevent erroneous recognition of a character string that is not actually contained in the video. As a result, in an information display device that translates a character string contained in the video and then displays a translation of the character string via superimposition on the video, it is possible to prevent displaying, via superimposition on the video, a translation of a character string that is incomprehensible. Furthermore, even in a case where the character string recognition device experiences shake during video recording, due to hand-induced shake or some other factor, it is possible to prevent displaying, via superimposition on the video, a translation of a character string that is incomprehensible.

In a second aspect of the present invention, the character string recognition device in accordance with the first aspect can be configured such that: the determination section firstly determines whether the rectangular region overlaps the first end region; in a case where the rectangular region has been determined as overlapping the first end region, the determination section subsequently determines whether the rectangular region overlaps the another rectangular region by a certain percentage or more; and in a case where the rectangular region has been determined as not overlapping the another rectangular region by a certain percentage or more, the determination section lastly determines whether the rectangular region overlaps the second end region.

The above configuration makes it possible to efficiently determine whether to perform character string recognition for a rectangular region having been extracted.

In a third aspect of the present invention, the character string recognition device in accordance with the first or second aspect can be configured such that the first end is any end in a horizontal direction of the image, and the second end is an end which is opposite the first end in the horizontal direction of the image.

With the above configuration, in a video in which a target of translation is a horizontally-written character string, it is possible to prevent displaying, via superimposition on the video, a translation of a character string that is incomprehensible.

In order to solve the abovementioned problem, in a fourth aspect of the present invention, a character string recognition method includes the steps of: capturing an image of a subject to create a video of the subject; extracting, from any image contained in the video, a rectangular region being a unit region for recognition of a character string; determining the rectangular region to be "true" in a case where conditions (a) and (b) are met or determining the rectangular region to be "false" in a case where at least one of the conditions (a) and (b) is not met, the condition (a) being such that the rectangular region does not overlap, by a certain percentage or more, another rectangular region contained in another image in the video, the another image being an immediately previous target of translation processing, the another rectangular region containing an actually recognized character string, the condition (b) being such that the rectangular region overlaps only either a first end region or a second end region, the first end region having a predetermined width and being located in a first end of the image, the second end region having a predetermined width and being located in a second end of the image which second end is opposite the first end; and performing a character string recognition for the rectangular region in a case where the rectangular region is determined to be "false" in the step of determining, the performing of the character string recognition being skipped in a case where the rectangular region is determined to be "true" in the step of determining.

The above configuration brings about effects similar to those of the character string recognition device in accordance with the first aspect of the present invention.

In order to solve the abovementioned problem, in a fifth aspect of the present invention, a character string recognition device (terminal device 1) includes: an image capture section (image capture section 10) for capturing an image of a subject to create a video of the subject; an extraction section (rectangular region extraction section 12) for extracting, from any image contained in the video, a rectangular region being a unit region for recognition of a character string; a determination section for determining the rectangular region to be "true" in a case where conditions (a) and (b) are met or determining the rectangular region to be "false" in a case where at least one of the conditions (a) and (b) is not met, the condition (a) being such that the rectangular region has a width that is equal to or less than a predetermined fraction of a width of the image, the condition (b) being such that the rectangular region has a height equal to or greater than a product of multiplying the width of the rectangular region by a predetermined factor; and a recognition section (character string recognition section 18) for performing a character string recognition for the rectangular region in a case where the rectangular region is determined to be "false" by the determination section, the recognition section skipping the character string recognition for the rectangular region in a case where the rectangular region is determined to be "true" by the determination section.

With the above configuration, in a case where a rectangular region, having been extracted, is determined to be vertically elongated, character string recognition is skipped for the rectangular region. Typically, in horizontally written languages such as English, it is highly likely that a rectangular region that is vertically elongated does not actually contain any character string and has been extracted in error. Therefore, with the above configuration, it is possible to prevent erroneous recognition of a character string not actually contained in the video. As a result, in an information display device that translates a character string contained in the video and then displays a translation of the character string via superimposition on the video, it becomes possible to prevent displaying, via superimposition on the video, a translation of a character string that is incomprehensible.

In order to solve the abovementioned problem, in a sixth aspect of the present invention, a character string recognition method includes the steps of: capturing an image of a subject to create a video of the subject; extracting, from any image contained in the video, a rectangular region being a unit region for recognition of a character string; determining the rectangular region to be "true" in a case where conditions (a) and (b) are met or determining the rectangular region to be "false" in a case where at least one of the conditions (a) and (b) is not met, the condition (a) being such that the rectangular region has a width that is equal to or less than a predetermined fraction of a width of the image, the condition (b) being such that the rectangular region has a height equal to or greater than a product of multiplying the width of the image by a predetermined factor; and performing a character string recognition for the rectangular region in a case where the rectangular region is determined to be "false" in the step of determining, the performing of the character string recognition being skipped in a case where the rectangular region is determined to be "true" in the step of determining.

The above configuration brings about effects similar to those of the character string recognition device in accordance with the fifth aspect of the present invention.

In order to solve the abovementioned problem, in a seventh aspect of the present invention, an information processing device includes: the character string recognition device according to any one of the first, second, third, or fifth aspects above; a translation section that translates the character string having been recognized to create a translation of character string; and a display section that displays the video on which the translation of the character string is superimposed.

With the above configuration, it is possible to prevent erroneous recognition of a character string that is not actually contained in a video, and, as a result, it is possible to prevent displaying, via superimposition on the video, a translation of a character string that is incomprehensible.

The character string recognition device in accordance with each aspect of the present invention can be realized by a computer. In such a case, the present invention encompasses: a control program for the character recognition device which control program causes a computer to operate as the various sections of the character string recognition device so that the character recognition device can be realized by the computer; and a computer-readable storage medium storing the control program therein.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

For example, in Embodiment 1, the terminal device 1 translates a character string of a horizontally written language (English) into a character string of another horizontally written language (Japanese). However, the terminal device 1 can be configured to translate a character string of a vertically written language (for example, Chinese) into a character string of a vertically written language (for example, Japanese). Therefore, the "first end" and "second end" recited in the claims below may be ends in a vertical direction of the image 30.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention can be used in wide-ranging applications as a character string recognition device that recognizes a character string in a video and as various information processing devices (such as a smartphone, a tablet device, and the like) that are provided with such a character string recognition device, translate a recognized character string, and superimpose the resulting translation of the character string in real-time playback of the video.

REFERENCE SIGNS LIST

1 Terminal device (character string recognition device, information processing device)
2 Camera
4 Display
6 Control section
10 Image capture section (image capture section)
12 Rectangular region extraction section (extraction section)
14 Recognition determination section (determination section)
16 Recognition record memory section
18 Character string recognition section (recognition section)
20 Translation section (translation section)
22 Image processing section
24 Display section (display section)

The invention claimed is:

1. A character string recognition device comprising:
an image capture section for capturing an image of a subject to create a video of the subject;
an extraction section for extracting, from any image contained in the video, a rectangular region being a unit region for recognition of a character string;
a determination section for determining the rectangular region to be "true" in a case where conditions (a) and (b) are met or determining the rectangular region to be "false" in a case where at least one of the conditions (a) and (b) is not met, the condition (a) being such that the rectangular region does not overlap, by a certain percentage or more, another rectangular region contained in another image in the video, the another image being an immediately previous target of translation processing, the another rectangular region containing an actually recognized character string, the condition (b) being such that the rectangular region overlaps only either a first end region or a second end region, the first end region having a predetermined width and being located in a first end of the image, the second end region having a predetermined width and being located in a second end of the image which second end is opposite the first end; and
a recognition section for performing a character string recognition for the rectangular region in a case where the rectangular region is determined to be "false" by the determination section, the recognition section skipping the character string recognition for the rectangular region in a case where the rectangular region is determined to be "true" by the determination section.

2. The character string recognition device set forth in claim 1, wherein:
the determination section firstly determines whether the rectangular region overlaps the first end region;
in a case where the rectangular region has been determined as overlapping the first end region, the determination section subsequently determines whether the rectangular region overlaps the another rectangular region by a certain percentage or more; and
in a case where the rectangular region has been determined as not overlapping the another rectangular region by a certain percentage or more, the determination section lastly determines whether the rectangular region overlaps the second end region.

3. The character string recognition device set forth in claim 1, wherein the first end is any end in a horizontal direction of the image, and the second end is an end which is opposite the first end in the horizontal direction of the image.

4. A character string recognition method comprising the steps of:
capturing an image of a subject to create a video of the subject;
extracting, from any image contained in the video, a rectangular region being a unit region for recognition of a character string;
determining the rectangular region to be "true" in a case where conditions (a) and (b) are met or determining the rectangular region to be "false" in a case where at least one of the conditions (a) and (b) is not met, the condition (a) being such that the rectangular region does not overlap, by a certain percentage or more, another rectangular region contained in another image in the video, the another image being an immediately previous target of translation processing, the another rectangular region containing an actually recognized character string, the condition (b) being such that the rectangular region overlaps only either a first end region or a second end region, the first end region having a predetermined width and being located in a first end of the image, the second end region having a predetermined width and being located in a second end of the image which second end is opposite the first end; and performing a character string recognition for the rectangular region in a case where the rectangular region is determined to be "false" in the step of determining, the performing of the character string recognition being skipped in a case where the rectangular region is determined to be "true" in the step of determining.

\* \* \* \* \*